(12) United States Patent
Mori et al.

(10) Patent No.: US 10,088,497 B2
(45) Date of Patent: Oct. 2, 2018

(54) ACCELERATION SENSOR

(71) Applicant: Panasonic Intellectual Property Management Co., Ltd., Osaka (JP)

(72) Inventors: Takeshi Mori, Osaka (JP); Keisuke Kuroda, Osaka (JP); Hitoshi Yoshida, Osaka (JP); Kazuo Goda, Osaka (JP); Takumi Taura, Kyoto (JP); Hideki Ueda, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

(21) Appl. No.: 15/073,645

(22) Filed: Mar. 18, 2016

(65) Prior Publication Data

US 2016/0202287 A1    Jul. 14, 2016

Related U.S. Application Data

(63) Continuation of application No. PCT/JP2014/005119, filed on Oct. 8, 2014.

(30) Foreign Application Priority Data

Oct. 9, 2013    (JP) ................................. 2013-211538
Feb. 21, 2014   (JP) ................................. 2014-031342

(51) Int. Cl.
*G01P 21/00*    (2006.01)
*G01P 15/08*    (2006.01)
(Continued)

(52) U.S. Cl.
CPC .............. *G01P 21/00* (2013.01); *G01P 15/08* (2013.01); *G01P 15/125* (2013.01); *G01P 15/18* (2013.01); *G01P 2015/0831* (2013.01)

(58) Field of Classification Search
CPC ........................................................ G01P 15/08
See application file for complete search history.

(56) References Cited

U.S. PATENT DOCUMENTS

| 5,353,641 A * | 10/1994 | Tang | G01P 15/125 |
| | | | 73/514.18 |
| 5,396,247 A * | 3/1995 | Watanabe | G04F 10/005 |
| | | | 341/157 |
| 2011/0154906 A1* | 6/2011 | Grosjean | G01D 5/24 |
| | | | 73/771 |

FOREIGN PATENT DOCUMENTS

| JP | 3-024466 | 2/1991 |
| JP | 5-223844 | 9/1993 |

(Continued)

OTHER PUBLICATIONS

International Search Report of PCT application No. PCT/JP2014/005119 dated Jan. 13, 2015.

*Primary Examiner* — Paul West
*Assistant Examiner* — Mark A Shabman
(74) *Attorney, Agent, or Firm* — McDermott Will & Emery LLP

(57) ABSTRACT

An acceleration sensor includes a CV conversion circuit, an AD conversion circuit, and first and second registers. The CV conversion circuit outputs a voltage corresponding to the capacitance changes between a movable electrode and each of first and second fixed electrodes disposed to face the movable electrode. The AD conversion circuit is connected to the CV conversion circuit and has a first detection range and a second detection range. The first register is connected to the AD conversion circuit and holds a first value. The second register is connected to the AD conversion circuit and holds a second value. The first value contains information about an acceleration in the first detection range, and the second value contains information about an acceleration in (Continued)

the second detection range. The first and second values indicate accelerations in the same direction.

8 Claims, 13 Drawing Sheets

(51) Int. Cl.
*G01P 15/125* (2006.01)
*G01P 15/18* (2013.01)

(56) References Cited

FOREIGN PATENT DOCUMENTS

| | | |
|---|---|---|
| JP | 7-306061 | 11/1995 |
| JP | 2009-063471 | 3/2009 |
| JP | 2010-071858 | 4/2010 |
| JP | 2011-069628 | 4/2011 |

* cited by examiner

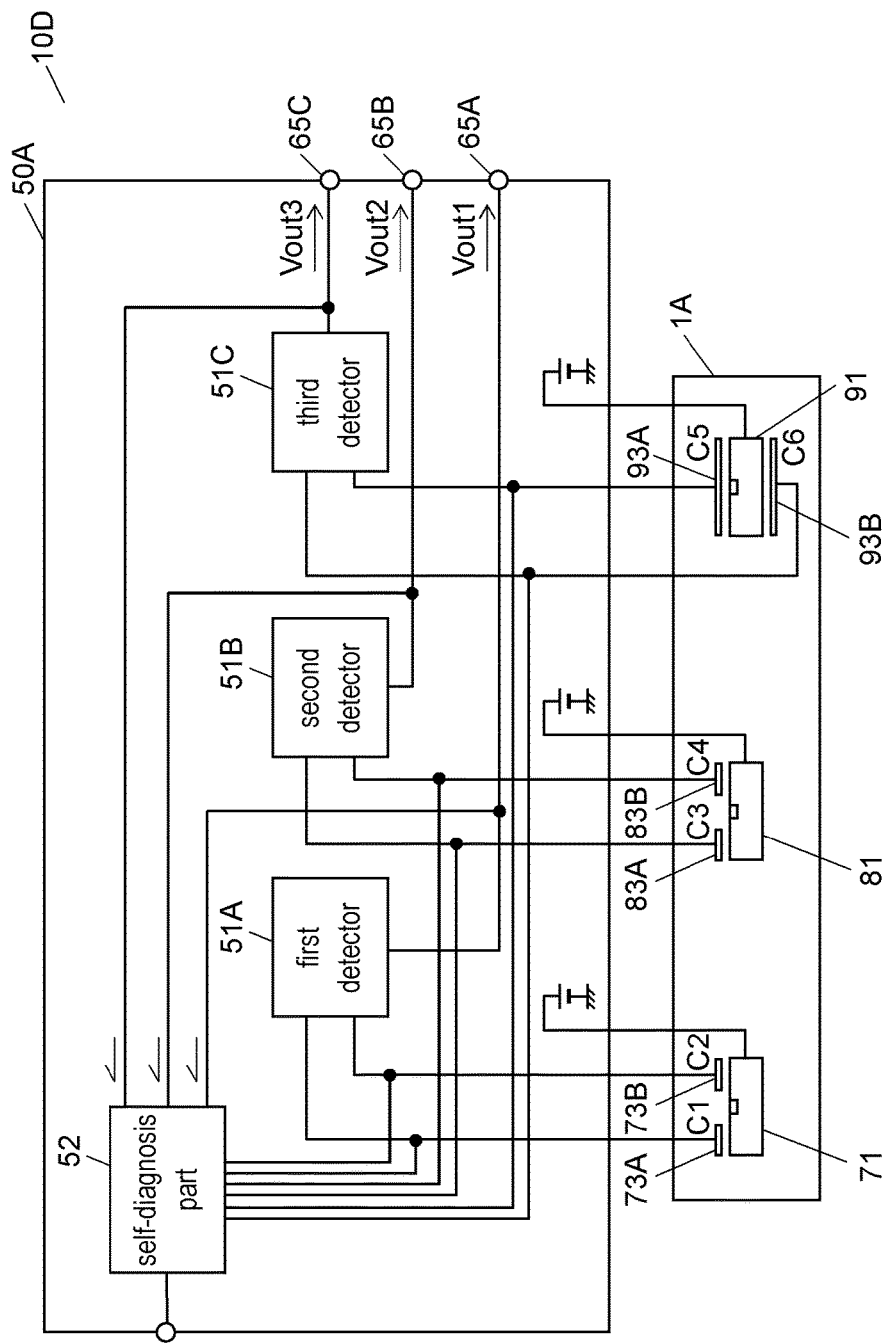

ACCELERATION SENSOR

BACKGROUND

1. Technical Field

The present disclosure relates to an acceleration sensor for use in vehicles, navigation devices, mobile terminals, and the like.

2. Background Art

Conventional acceleration sensor 100 will now be described with reference to FIG. 16. FIG. 16 is a block diagram of acceleration sensor 100. Acceleration sensor 100 includes detection element 102, CV conversion circuit 104, signal conditioning circuit 106, and AD converter 110.

Detection element 102 includes a movable electrode, and a fixed electrode facing the movable electrode, and a capacitor is formed between these electrodes. When an acceleration is applied from outside, the capacitor changes its capacitance. CV conversion circuit 104 converts the capacitance change in this capacitor into a voltage. Signal conditioning circuit 106 corrects this converted voltage. AD converter 110 converts the corrected voltage into a digital value and outputs the value.

As a document disclosing such a technique, Japanese Unexamined Patent Publication No. 2009-063471 is known, for example.

SUMMARY

The present disclosure provides an acceleration sensor which is equipped with an AD converter and concurrently achieves wide dynamic range and high-resolution output.

The acceleration sensor of the present disclosure includes a movable electrode, first and second fixed electrodes, a capacitance-to-voltage (CV) conversion circuit, an AD conversion circuit, and first and second registers. The movable electrode is to be displaced with a change in applied acceleration. The first and second fixed electrodes are disposed to face the movable electrode. The CV conversion circuit outputs a voltage corresponding to the capacitance changes between the movable electrode and each of the first and second fixed electrodes. The AD conversion circuit is connected to the CV conversion circuit and has a first detection range and a second detection range different from the first detection range. The first register is connected to the AD conversion circuit and holds a first value containing information about an acceleration in the first detection range. The second register is connected to the AD conversion circuit and holds a second value containing information about an acceleration in the second detection range. The first value and the second value indicate accelerations in an equal direction.

In this configuration, the first register holds the first value containing information about an acceleration in the first detection range in a high-resolution. The second register holds the second value containing information about an acceleration in the second detection range and being in the same direction as the first value in a low-resolution. This configuration allows detecting information about an acceleration in an arbitrary detection range in a high-resolution and detecting the acceleration in a wide dynamic range.

BRIEF DESCRIPTION OF DRAWINGS

FIG. 13 is a block diagram of an acceleration sensor including a signal processing circuit which processes signals received from the sensor part shown in FIG. 12.

DETAILED DESCRIPTION OF PREFERRED EMBODIMENTS

Figure 16:
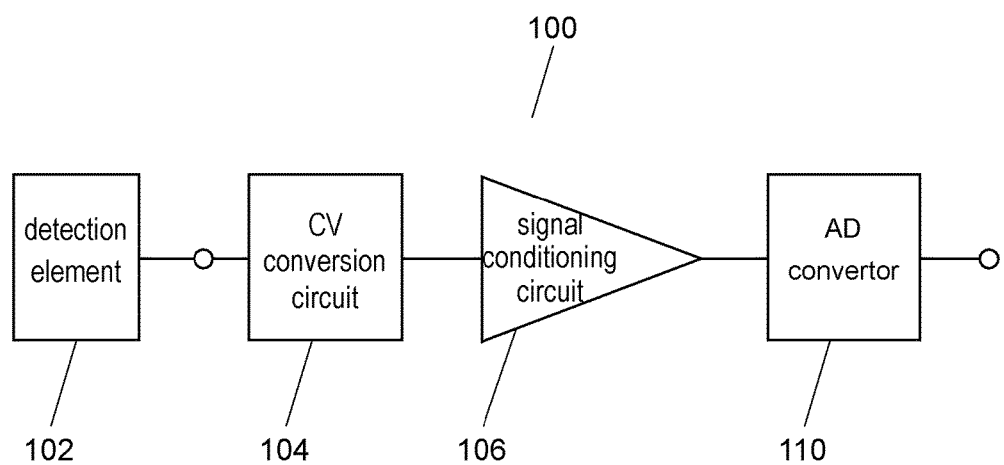
FIG. 16 is a block diagram of a conventional acceleration sensor.

Prior to describing exemplary embodiments of the present disclosure, problems of conventional acceleration sensor 100 shown in FIG. 16 will now be briefly described. In the configuration of acceleration sensor 100, concurrent achievement of wide dynamic range (detectable acceleration range) and high-resolution output requires AD converter 110 to have high resolution. A high-resolution AD converter, however, is sensitive to noise effect, making it necessary to provide a peripheral circuit for eliminating the noise effect. This leads to an increase in circuit area and power consumption. Thus, increasing the dynamic range by employing a high-resolution AD converter results in an increase in the size of the sensor, and hence, the cost and the power consumption.

Hereinafter, the exemplary embodiments of the present disclosure will be described in detail with reference to drawings. In these embodiments, the same components as in the preceding embodiments are denoted by the same reference numerals, and thus a description thereof may be omitted in the subsequent embodiments.

First Exemplary Embodiment

Figure 1:
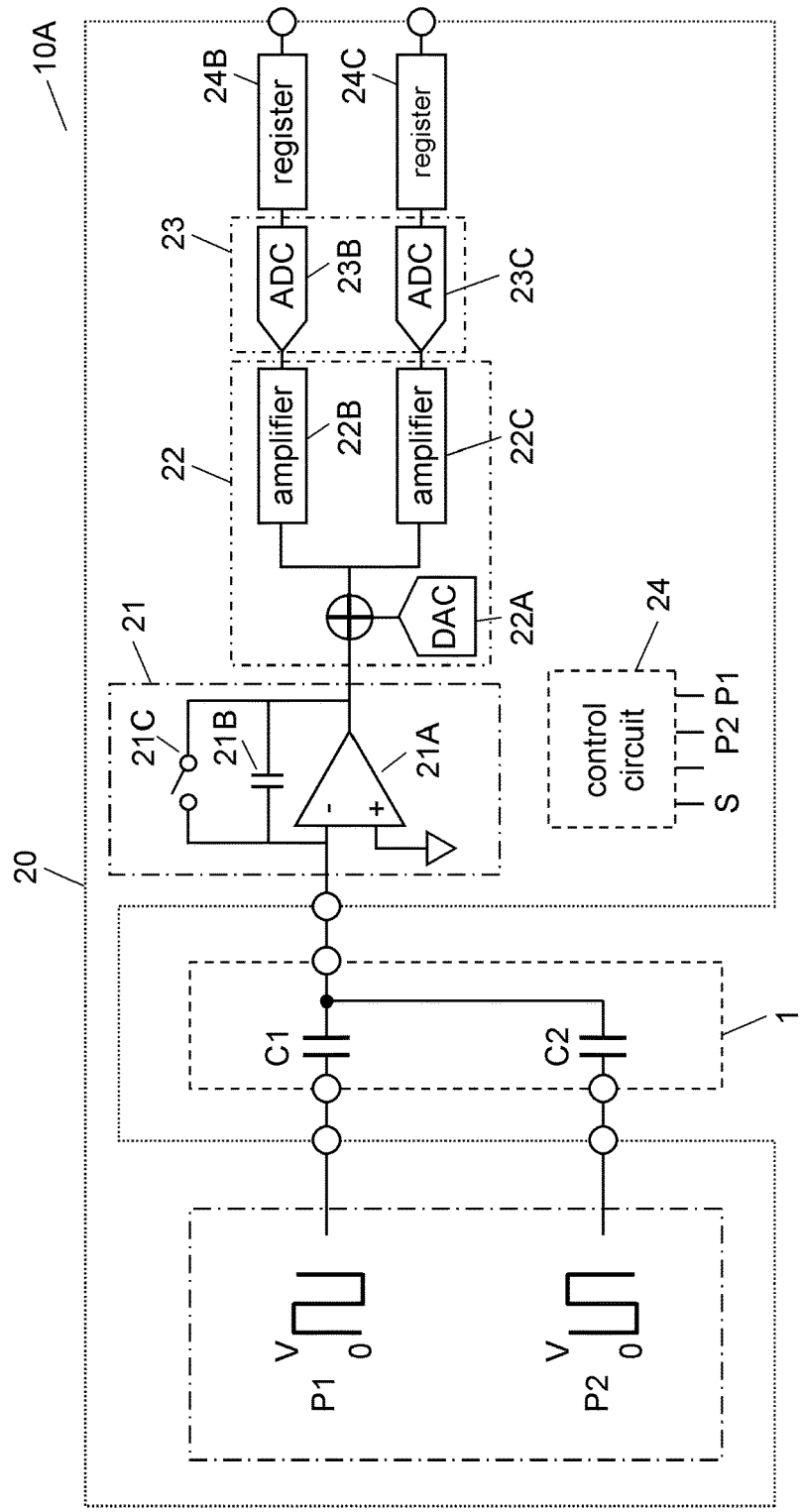
FIG. 1 is a configuration diagram of an acceleration sensor according to a first exemplary embodiment of the present disclosure.
Figure 2:
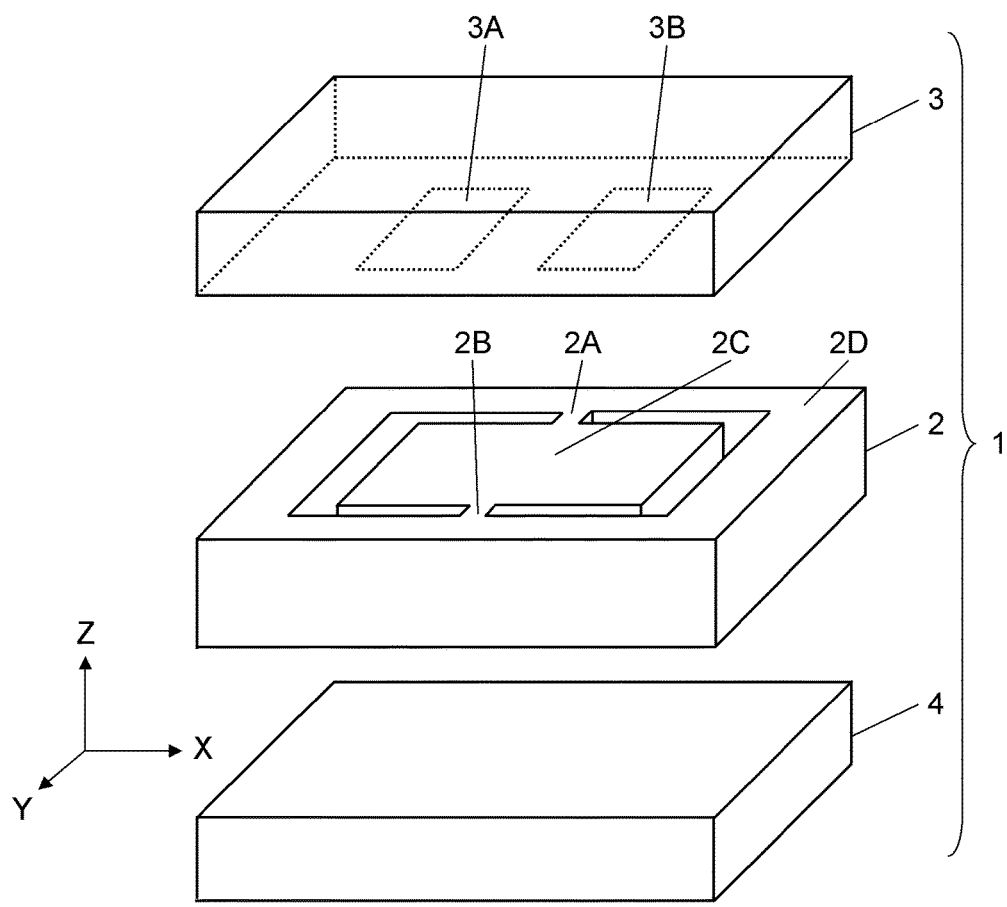
FIG. 2 is a schematic perspective view of a sensor part shown in FIG. 1.

FIG. 1 is a configuration diagram of acceleration sensor 10A according to a first exemplary embodiment of the present disclosure. FIG. 2 is a schematic perspective view of sensor part 1.

As shown in FIG. 1, acceleration sensor 10A includes sensor part 1 and detection circuit 20. Detection circuit 20 includes capacitance-to-voltage (CV) conversion circuit 21, AD conversion circuit 23, first register (hereinafter, register) 24B, and second register (hereinafter, register) 24C. Detection circuit 20 further includes signal conditioning circuit 22 and control circuit 24.

As shown in FIG. 2, sensor part 1 includes top lid 3, bottom lid 4, and acceleration sensor element 2 disposed between lids 3 and 4. Acceleration sensor element 2 includes a pair of torsion beams 2A and 2B, movable electrode 2C, and frame part 2D. On top lid 3, first fixed electrode (hereinafter, fixed electrode) 3A and second fixed electrode (hereinafter, fixed electrode) 3B are fixed at positions facing movable electrode 2C. The upper and lower surfaces of acceleration sensor element 2 are supported by top lid 3 and bottom lid 4 in a sandwiched manner. Acceleration sensor element 2 is made, for example, of a silicon substrate, and lids 3, 4 are made of an insulator such as glass.

In sensor part 1, when an X-axis acceleration is applied to twist the weight about the axis, movable electrode 2C moves like a seesaw around beams 2A and 2B as the axis. Movable electrode 2C is displaced in response to the change of the applied acceleration.

When the surface of movable electrode 2C is divided into two halves with respect to the line connecting beams 2A and 2B, one half faces fixed electrode 3A and the other half faces fixed electrode 3B. Fixed electrodes 3A and 3B are led out to the upper surface of top lid 3 via through electrodes (not shown), which are made, for example, of silicon and disposed on top lid 3.

In this configuration, the capacitance changes between movable electrode 2C and each of fixed electrodes 3A and 3B can be measured and used to detect the X-axis acceleration. In other words, a combination of movable electrode 2C and fixed electrode 3A and a combination of movable electrode 2C and fixed electrode 3B form a pair of differential capacitances. When movable electrode 2C receives an acceleration and is displaced, these capacitances change with the displacement of movable electrode 2C. Detection circuit 20 detects the acceleration from the capacitance change between movable electrode 2C and fixed electrode 3A and also the capacitance change between movable electrode 2C and fixed electrode 3B. To achieve this detection, control circuit 24 periodically applies a carrier signal P1 between movable electrode 2C and fixed electrode 3A, and a carrier signal P2 between movable electrode 2C and fixed electrode 3B.

CV conversion circuit 21 converts the capacitance changes in sensor part 1 into a voltage. CV conversion circuit 21 is formed of amplifier 21A, capacitor 21B, and switch 21C. The inverting input terminal of amplifier 21A is connected to movable electrode 2C. Capacitor 21B and switch 21C are connected in parallel with amplifier 21A between the inverting input terminal and the output terminal. The non-inverting input terminal of amplifier 21A receives a reference voltage V0.

Signal conditioning circuit 22 includes DA converter 22A and parallel-connected amplifiers 22B and 22C. Signal conditioning circuit 22 samples the output voltage of CV conversion circuit 21. DA converter 22A adds an arbitrary offset voltage to the output voltage. Amplifiers 22B and 22C amplify the output voltage to have respective predetermined sensitivities and output them as acceleration detection signals to AD conversion circuit 23.

Control circuit 24 generates, based on the reference clock, carrier signals P1 and P2 to be applied to fixed electrodes 3A and 3B, respectively, and switch signal S to open and close switch 21C, and outputs these signals. The carrier signals P1 and P2 have a voltage level of 1.2 V, but may alternatively have a larger voltage level if the operation signal level needs to be larger. Switch 21C is formed of a semiconductor switch and is closed when the switch signal from control circuit 24 is high.

Figure 3:
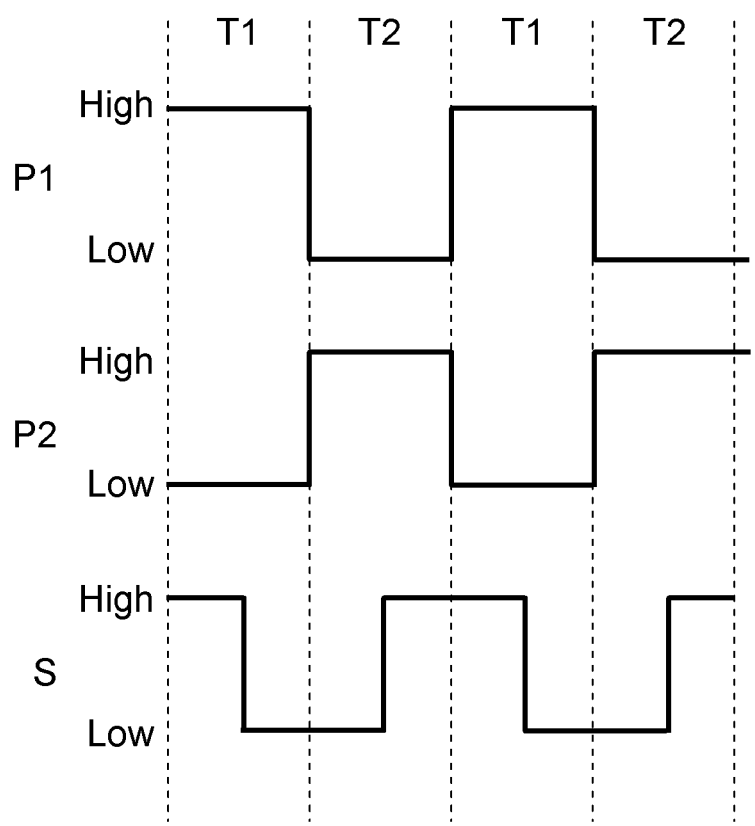
FIG. 3 is a signal waveform diagram showing a detection operation performed by a detection circuit shown in FIG. 1.

Acceleration sensor 10A with the above-described structure will now be described with reference to FIG. 3. FIG. 3 is a signal waveform diagram showing a detection operation performed by detection circuit 20.

The carrier signals P1, P2, and the switch signal S output from control circuit 24 are square-wave signals with constant amplitude, and change from high to low or vice versa between two periods (first period T1 and second period T2). The carrier signals P1 and P2 have opposite voltage levels to each other, and the switch signal S is different in phase from the carrier signals P1 and P2. In the present exemplary embodiment, the phase shift is 90 degrees. In other words, the signal S changes from high to low or vice versa at the intermediate time between the first period T1 and the second period T2.

In the first period T1, the carrier signal P1 is high, the carrier signal P2 is low, and the switch signal S changes from high to low at the midpoint of the first period T1. As a result, a V0 voltage is applied to the non-inverting input terminal of amplifier 21A, an input voltage V is applied to movable electrode 2C, and capacitor 21B is discharged. In the following description, the input voltage is 0.6 (V) as an example.

In this situation, between movable electrode 2C and fixed electrode 3A, there is an accumulation of charges with an amount of Q1=−C1×0.6. The minus sign "−" indicates that negative charges accumulate on the one half of the surface of movable electrode 2C which faces fixed electrode 3A. Between movable electrode 2C and fixed electrode 3B, there is an accumulation of charges with an amount of Q2=C2×0.6.

In the first half of the second period T2, the voltage levels of the carrier signals P1 and P2 are reversed, that is, the carrier signal P1 is low, the carrier signal P2 is high, and switch 21C opens.

At this moment, between movable electrode 2C and fixed electrode 3A, there is an accumulation of charges with an amount of Q1'=C1×0.6, whereas between movable electrode 2C and fixed electrode 3B, there is an accumulation of charges with an amount of Q2'=−C2×0.6. The difference ΔQ between the charge amount (Q1+Q2) accumulating on movable electrode 2C in the first period T1 and the charge amount (Q1'+Q2') accumulating on movable electrode 2C in the second period T2 is defined as ΔQ=(Q1+Q2)−(Q1'+Q2') =−(C1−C2)×1.2.

If differential capacitances C1 and C2 are different from each other, charges corresponding to the difference ΔQ is generated on movable electrode 2C, but amplifier 21A allows movable electrode 2C to keep the voltage V0. As a result, the charges corresponding to ΔQ accumulate on one electrode of capacitor 21B which is connected to movable electrode 2C. Meanwhile, on the other electrode of capacitor 21B, there is an accumulation of opposite-polarity charges corresponding to ΔQ'=(C1−C2)×1.2. As a result, the output terminal of amplifier 21A has a voltage corresponding to ΔQ'/Cf+0.6 (V)=(C1−C2)×1.2/Cf+0.6 (V), and outputs a voltage corresponding to the difference in capacitance (C1−C2). In the above formula, "Cf" represents the capacitance of capacitor 21B.

In the second half of the second period T2, switch 21C is closed and capacitor 21B is discharged again.

The above-mentioned voltages corresponding to the capacitance difference (C1−C2) are output as acceleration detection signals through the signal conditioning circuit.

Signal conditioning circuit 22 includes DA converter 22A and amplifiers 22B, 22C.

Figure 4:
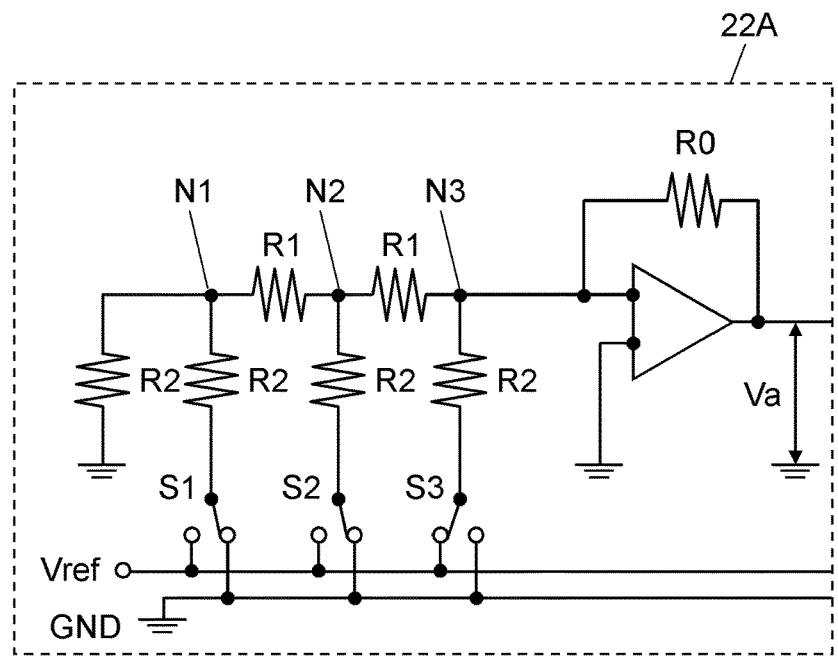
FIG. 4 is a circuit diagram of a DA converter of the detection circuit shown in FIG. 1.

FIG. 4 is a circuit diagram of DA converter 22A. DA converter 22A generates an analog voltage based on the digital signal. In the present exemplary embodiment, DA converter 22A, which performs offset adjustments, can be a ladder DA converter.

Switches S1 to S3 are opened and closed by digital signals. Switches S1 to S3 are each connected at a first end to a ground (GND) potential and at a second end to a reference potential (Vref) in the circuit. Each of switches S1 to S3 is switched between the first and second ends. Each of switches S1 to S3 further has a third end connected to one end of a resistive element R2. Each two adjacent resistive elements R2 are connected to each other at the other end via a resistive element R1. The resistive element R2 connected to the third end of switch S1 and one of two resistive elements R1 are connected at a connection N1. The resistive element R2 connected to the third end of switch S2 and the two resistive elements R1 are connected at a connection N2. The resistive element R2 connected to the third end of switch S3 and the other of the two resistive elements R1 are connected at a connection N3. The connection N1 is further connected to the GND potential via another resistive element R2. The connection N3 is further connected to a negative feedback amplifier circuit including a feedback resister R0.

The negative feedback amplifier circuit outputs an analog voltage Va, which is expressed by the formula below. The output potential can be controlled to any voltage by opening and closing the switches.

$$Va = Vref[(S1)/4 + (S2)/2 + (S3)]$$

In this formula, (S1) to (S3) become 1 when the second and third ends are connected, and become 0 when the first and third ends are connected in the switches S1 to S3.

In the meanwhile, increasing both the dynamic range (in the unit G) indicating a detectable acceleration range and the output resolution in a single AD converter requires increasing the resolution of the AD converter. Such a high-resolution AD converter has a large circuit area and high power consumption. Therefore, increasing the dynamic range in the high-resolution AD converter results in an increase in the size of the acceleration sensor, and hence, the cost and the power consumption.

Acceleration sensor 10A, on the other hand, includes AD conversion circuit 23 connected to CV conversion circuit 21; register 24B connected to AD conversion circuit 23 and holding a first value; and register 24C connected to AD conversion circuit 23 and holding a second value. The first value contains information about an acceleration in a first detection range, and the second value contains information about an acceleration in a second detection range. The first and second values indicate accelerations in an equal direction.

More specifically, the first detection range indicates the range of accelerations along the X axis shown in FIG. 2, for example, the range of −A(G) to +A(G), whereas the second detection range indicates the wider range of accelerations along the X axis than the range of −A(G) to +A(G).

Hence, the first value is output from AD conversion circuit 23 according to the acceleration in the first detection range. The first value is, for example, obtained by AD conversion circuit 23 AD converting the voltage of CV conversion circuit 21 when an acceleration is applied in the range of −A(G) to +A(G). Similarly, the second value is output from AD conversion circuit 23 according to the acceleration in the second detection range. The second value is, for example, obtained by AD conversion circuit 23 converting the voltage of CV conversion circuit 21 when an acceleration is applied in the range of −B (G) to +B (G). In these ranges, B is greater than A. First register 24B holds the first value, and second register 24C holds the second value.

Figure 5:
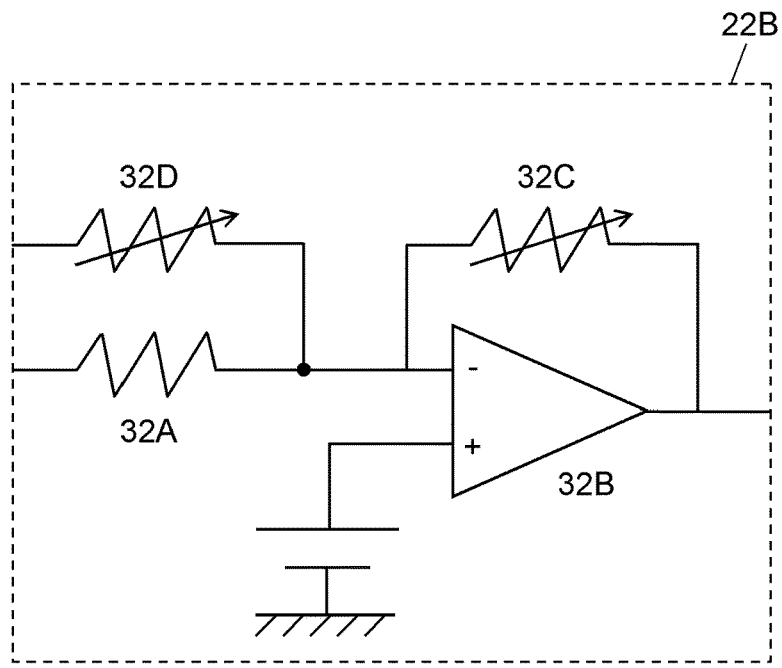
FIG. 5 is a circuit diagram of an amplifier in a signal conditioning circuit of the detection circuit shown in FIG. 1.

FIG. 5 is a circuit diagram of amplifier 22B. Amplifier 22B amplifies a current signal obtained by offset-adjusting the output of CV conversion circuit 21, in DA converter 22A. Amplifier 22B includes resistor 32A, operational amplifier 32B, resistor 32C for detection range adjustment, and resistor 32D for offset adjustment. Resistor 32A is connected at a first end to the output terminal of CV conversion circuit 21 and at a second end to the inverting input terminal of operational amplifier 32B. Resistor 32C is connected between the inverting input terminal and the output terminal of operational amplifier 32B. The non-inverting input terminal of operational amplifier 32B is connected to the reference potential. As a result, a negative feedback amplifier circuit is formed. Resistor 32D is connected with resistor 32A in parallel.

While the term "dynamic range" indicates the acceleration range detectable by the acceleration sensor, the "first detection range" indicates the range of voltage that first AD converter (hereinafter, AD converter) 23B can convert. In short, the "first detection range" is the acceleration range detectable by AD converter 23B. Similarly, the "second detection range" indicates the range of voltage that second AD converter (hereinafter, AD converter) 23C can convert. In short, the "second detection range" is the acceleration range detectable by AD converter 23C.

Thus, the resistance values of resistors 32A and 32C in amplifier 22B determine the acceleration range to be detected by AD converter 23B. In addition, adjusting the amount of current drawn by resistor 32D can determine the offset value of the output of acceleration sensor 10A.

Amplifier 22C has the same configuration as amplifier 22B, but is different in the resistance value of resistor 32C. As a result, amplifiers 22B and 22C detect accelerations in different ranges from each other. Amplifiers 22B and 22C send analog outputs to AD converters 23B and 23C, respectively.

AD converter 23B converts the analog voltage signal received from amplifier 22B into a digital signal and sends the digital signal to register 24B. Register 24B holds the output of AD converter 23B. This output is the first value. In the same manner, AD converter 23C converts the analog voltage signal received from amplifier 22C into a digital signal and sends the digital signal to register 24C. Register 24C holds the output of AD converter 23C. This output is the second value.

AD converter 23B has a higher resolution than that of AD converter 23C. For example, AD converter 23B has a resolution of 16 bits while AD converter 23C has a resolution of 12 bits. In short, the first value is obtained by digitizing the voltage received from CV conversion circuit 21 with a higher resolution than the second value.

Figure 6:
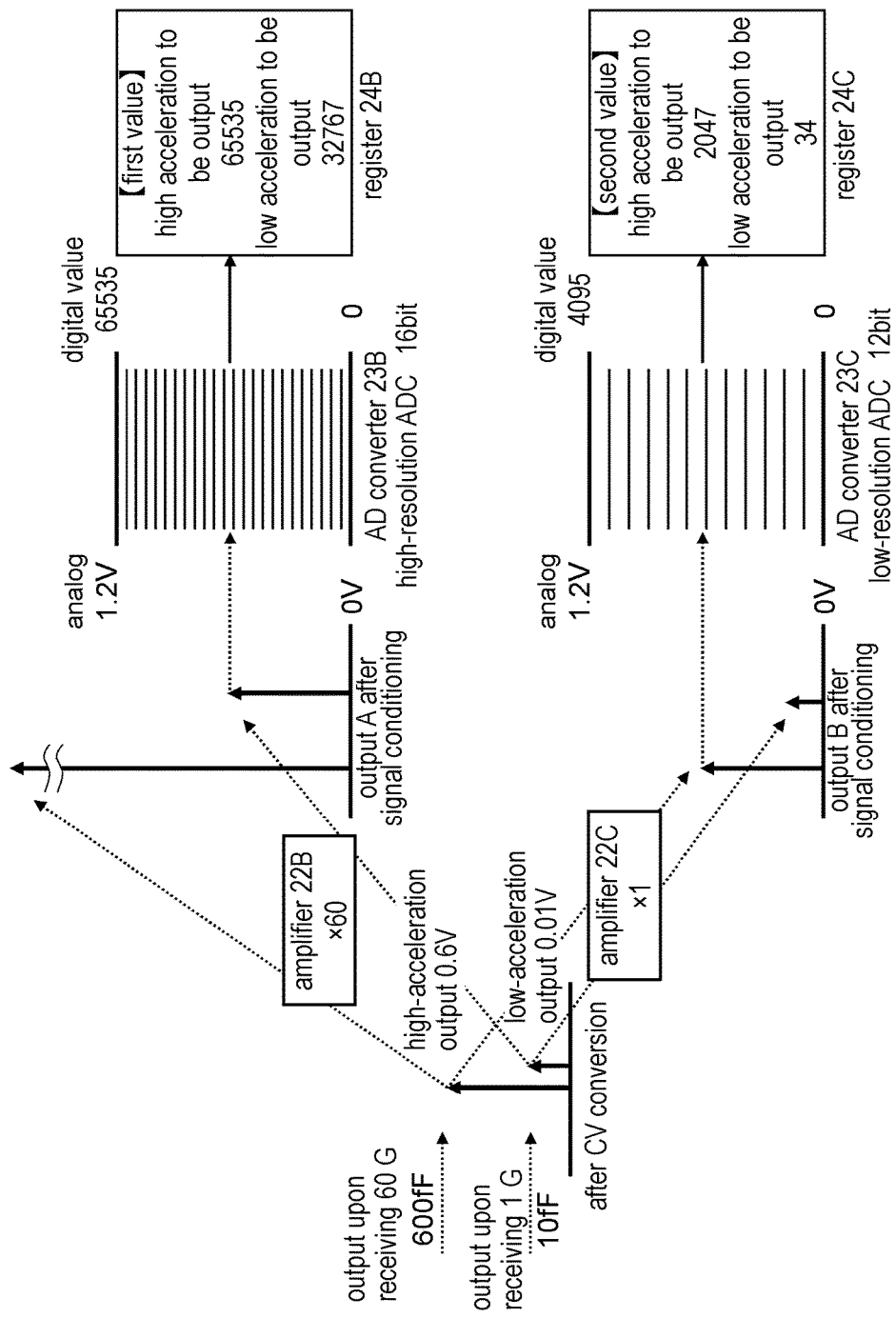
FIG. 6 is a diagram showing the processing of acceleration signals until the signals are output to registers in the acceleration sensor shown in FIG. 1.

Next is an example of the processing of acceleration signals until the signals are output to the registers, with reference to FIG. 6. FIG. 6 shows a signal processing examples in which an input of 1 G and an input of 60 G received by acceleration sensor 10A as a low acceleration and a high acceleration, respectively, are sent to registers 24B and 24C. In the following description, acceleration sensor 10A has a sensitivity of 10 fF/G, and the high acceleration of 60 G and the low acceleration of 1 G are in an equal direction.

The output (capacitance change) of sensor part 1 is converted into a voltage and amplified by amplifiers 22B and 22C during the signal conditioning process. The output of amplifier 22B is digitized by AD converter 23B and then stored as the first value in register 24B. The output of amplifier 22C is digitized by AD converter 23C and then stored as the second value in register 24C.

Since sensor part 1 has a sensitivity of 10 fF/G, sensor part 1 outputs a 10 fF signal when a low acceleration is applied, and outputs a 600 fF signal when a high acceleration is applied.

When CV conversion circuit 21 converts the output of sensor part 1 at 1 mV/1 fF, the output is converted into a voltage signal of 0.01 V in the case of a low acceleration and a voltage signal of 0.6 V in the case of a high acceleration. Amplifiers 22B and 22C in signal conditioning circuit 22 amplify the voltage signals obtained by the CV conversion and send AD conversion circuit 23 the amplified signals. When amplifier 22B has an amplification factor of 60, amplifier 22B amplifies the signal to 0.6 V in the case of a low acceleration and to 36 V in the case of a high acceleration. Similarly, when amplifier 22C has an amplification factor of 1, amplifier 22C amplifies the signal to 0.01 V in the case of a low acceleration and to 0.6 V in the case of a high acceleration.

A typical AD converter has an input range of several volts, and an output range varying widely depending on the resolution. In the present exemplary embodiment, the input range is set to about 1.2 V, and the output range has a high resolution of 16 bits and a low resolution of 12 bits.

In that case, AD converter 23B with 16-bit high resolution sends "32767" to register 24B as the first value based on the signal in the case of low acceleration. On the other hand, the signal in the case of high acceleration saturates the input range of AD converter 23B. In other words, the signal in the case of high acceleration exceeds the input range of AD converter 23B. As a result, AD converter 23B sends "65535" to register 24B as the first value, indicating that AD converter 23B is saturated. Thus, the output acceleration is not correct.

On the other hand, AD converter 23C with 12-bit low resolution sends "34" to register 24C as the second value based on the signal in the case of low acceleration. In the case of high acceleration, on the other hand, AD converter 23C sends "2047" to register 24C as the second value based on the signal. In either case, the output acceleration is correct.

Thus, both wide dynamic range and high resolution can be concurrently achieved by making first register 24B hold a low acceleration output of high-resolution AD converter 23B, and making second register 24C hold a high acceleration output of low-resolution AD converter 23C.

As described above, acceleration sensor 10A includes two registers for holding different resolution outputs depending on the range of acceleration. This enables acceleration sensor 10A to have a smaller circuit area and lower power consumption than an acceleration sensor including a single AD converter that achieves both wide dynamic range and high resolution.

Meanwhile, it is possible to diagnose the failure of acceleration sensor 10A using the first and second values. More specifically, acceleration sensor 10A is determined to be at fault when the difference between the second value and the product of the first value and a predetermined coefficient is not less than a predetermined threshold. The diagnostic method will now be described in detail with reference to FIG. 6.

Unless AD converters 23B and 23C are not saturated, the values held in registers 24B and 24C indicate the same amount of acceleration. Therefore, the difference between the first and second values is the difference in expression due to the difference in resolution between AD converters 23B and 23C. In other words, the first and second values differ only in whether they are expressed with low resolution or with high resolution. Assuming that the output of sensor part 1 is 14.8, for example, it becomes 14 in the case of a calculator with low resolution that can express only the integer part of the result, whereas it becomes 14.8 in the case of a calculator that can express the result to one decimal place. Note that the output result with low resolution (the second value) can be converted into the output result with high resolution (the first value) by calculating back the gain adjustment.

Thus, when acceleration sensor 10A is working properly, the following conditions are considered to be satisfied: INTEGER (the first value×the gain of amplifier 22C×the resolution of AD converter 23C÷the gain of amplifier 22B÷the resolution of AD converter 23B)=INTEGER (the second value). The example shown in FIG. 6 can be calculated as follows: INTEGER (the first value×the gain of amplifier 22C×the resolution of AD converter 23C÷the gain of amplifier 22B÷the resolution of AD converter 23B), which is INTEGER ($32767 \times 1 \times 2^{12} \div 60 \div 2^{16}$). The calculation result is 34. On the other hand, INTEGER (the second value) is INTEGER (34.13229 . . . ). The calculation result is 34, which is equal to the above-calculated value. However, in a case where one of the AD converters is at fault, and one of the first and second values is abnormal, the above-mentioned equality is not held.

Therefore, it is possible to diagnose the failure of acceleration sensor 10A by determining that AD conversion circuit 23 is at fault when the difference between the second value and the product of the first value and the predetermined coefficient is not less than a predetermined threshold. In other words, one of AD converters 23B and 23C is determined to be at fault when the difference between the second value and the product of the first value and the predetermined coefficient is not less than a predetermined threshold. Acceleration sensor 10A can perform a self-diagnosis by making control circuit 24 perform the above-mentioned calculations. It is also possible to provide a fault indicator composed, for example, of a light emitting diode to display self-diagnosis results based on the output of the control circuit.

Figure 7:
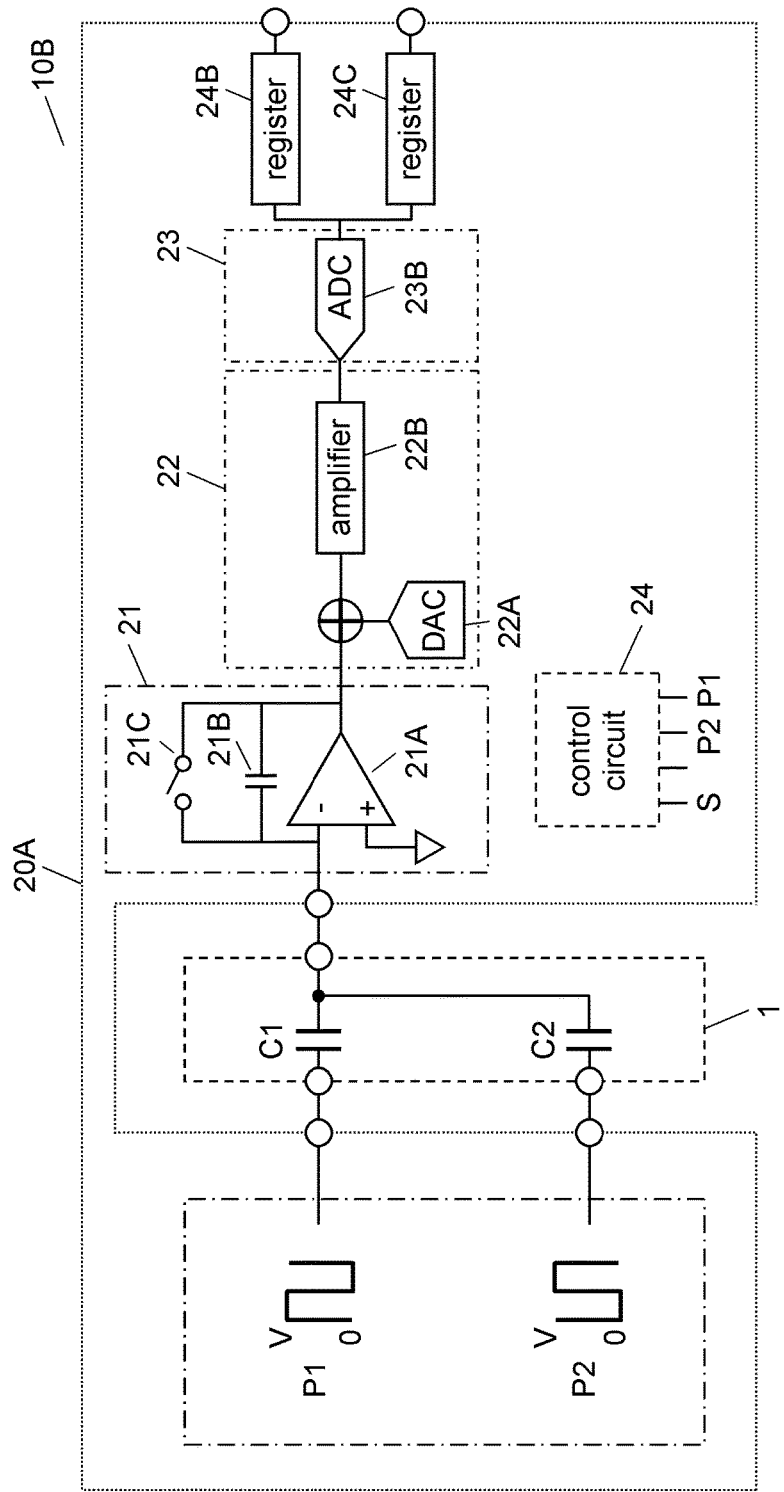
FIG. 7 is a configuration diagram of a detection circuit of another acceleration sensor according to the first exemplary embodiment of the present disclosure.

Next, another detection circuit 20A according to the present exemplary embodiment will now be described with reference to FIG. 7. FIG. 7 is a configuration diagram of the detection circuit of acceleration sensor 10B. Detection circuit 20A differs from detection circuit 20 shown in FIG. 1 only in that signal conditioning circuit 22 includes DA converter 22A and amplifier 22B, and that AD conversion circuit 23 is composed of AD converter 23B alone.

Detection circuit 20A operates such that acceleration signals in the equal direction are switched with time. First, amplifier 22B sends an output that has been AD-converted with a low first amplification factor to register 24B. Next, amplifier 22B sends an output that has been AD-converted with a second amplification factor to register 24C. The second amplification factor is greater than the first amplification factor.

As a result of these operations, register 24B holds, as the first value, a low-resolution signal in the wide first detection range. After this, register 24C holds, as the second value, a high-resolution signal in the narrow second detection range. Thus, detection circuit 20A includes two registers 24B and 24C for holding different resolution outputs depending on the range of acceleration. This reduces the circuit area and the power consumption.

Note that the "signal conditioning circuit" indicates a functional block for adjusting signals as desired. More specifically, the "signal conditioning circuit" can include the following: a sample hold circuit, an offset adjustment circuit, an amplifier, and if necessary, a filter. The order of these components is not uniquely determined.

Also, the "AD conversion circuit" indicates a functional block for AD conversion, and includes a filter if necessary, such as low-pass filter or an anti-aliasing filter. Thus, the "AD conversion circuit" is not limited to a combination of a filter and an AD converter, but can be any functional block for AD conversion.

The phrase "to digitize the output voltage of the CV conversion circuit" means that the output voltage of the CV conversion circuit is digitized either directly or after being subjected to offset adjustment, amplification, and filtering.

As described above, acceleration sensors 10A and 10B according to the present exemplary embodiment include movable electrode 2C, first fixed electrode 3A, second fixed electrode 3B, CV conversion circuit 21, AD conversion circuit 23, first register 24B, and second register 24C. Movable electrode 2C is displaced with a change in applied acceleration. First fixed electrode 3A and second fixed electrode 3B are disposed to face movable electrode 2C. CV conversion circuit 21 outputs a voltage corresponding to the capacitance changes between movable electrode 2C and each of first and second fixed electrodes 3A and 3B. AD conversion circuit 23 is connected to CV conversion circuit 21 and has a first detection range and a second detection range different from the first detection range. First register 24B is connected to AD conversion circuit 23 and holds the first value containing information about an acceleration in the first detection range. Second register 24C is connected to AD conversion circuit 23 and holds the second value containing information about an acceleration in the second detection range. The first and second values indicate accelerations in an equal direction. This configuration allows acceleration sensors 10A and 10B to have both wide dynamic range and high resolution output.

Second Exemplary Embodiment

Figure 8:
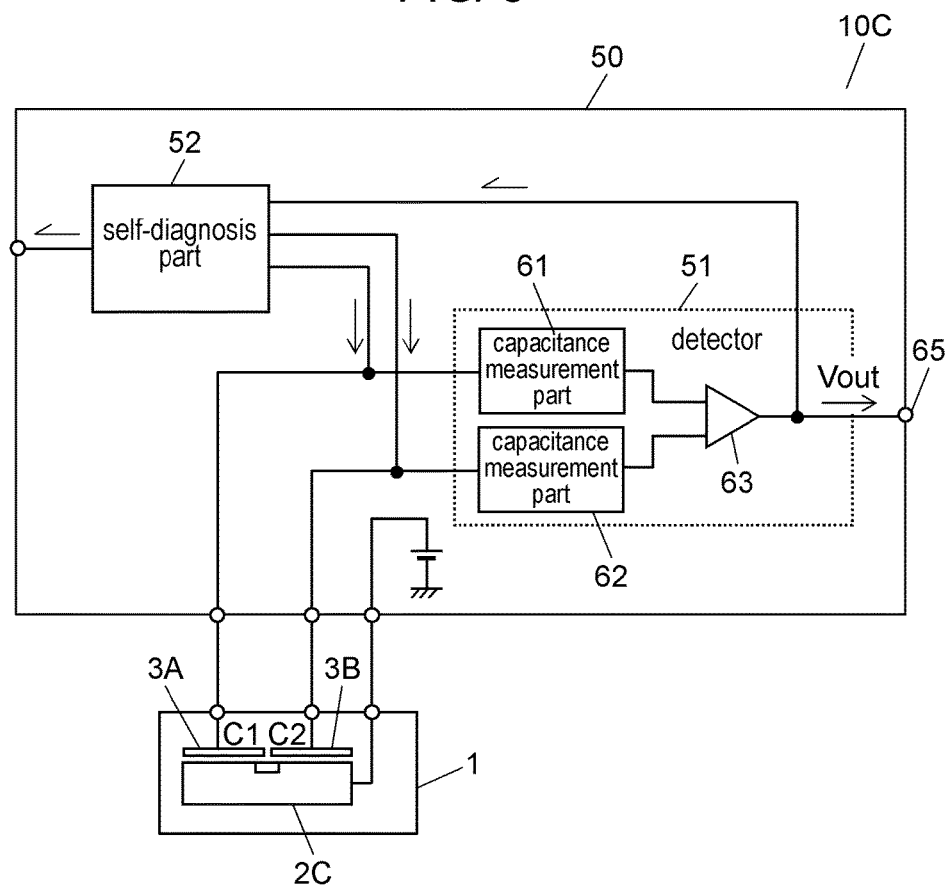
FIG. 8 is a block diagram of an acceleration sensor according to a second exemplary embodiment of the present disclosure.

Acceleration sensor 10C according to a second exemplary embodiment of the present disclosure will now be described with reference to FIGS. 8 to 11. The present exemplary embodiment is focused on a self-diagnosis function to determine whether or not sensor part 1 is at fault. FIG. 8 is a block diagram of acceleration sensor 10C. Acceleration sensor 10C includes sensor part 1 shown in FIG. 2 of the first exemplary embodiment and signal processing circuit 50, which processes signals from sensor part 1.

Signal processing circuit 50 includes detector 51 which detects the relative displacement of movable electrode 2C with respect to fixed electrodes 3A and 3B; and self-diagnosis part 52 which self-diagnoses whether or not movable electrode 2C is properly displaced from fixed electrodes 3A and 3B.

Detector 51 includes capacitance measurement parts 61 and 62 and capacitance difference calculator 63. Capacitance measurement part 61 measures the capacitance C1 between fixed electrode 3A and movable electrode 2C. Capacitance measurement part 62 measures the capacitance C2 between fixed electrode 3B and movable electrode 2C. Capacitance measurement parts 61 and 62 send voltages corresponding to the measured capacitances to capacitance difference calculator 63. In other words, capacitance measurement parts 61 and 62 have CV conversion function.

Capacitance difference calculator 63 calculates the difference between the output voltages of capacitance measurement parts 61 and 62, and sends the difference, as a detection voltage Vout, to an external device (not shown) through detection output terminal 65 of signal processing circuit 50.

The capacitances C1 and C2 change with the relative displacement (the direction and angle of twist) of movable electrode 2C with respect to fixed electrodes 3A and 3B. Therefore, the difference between the capacitances C1 and C2 corresponds to the relative displacement of movable electrode 2C with respect to fixed electrodes 3A and 3B. This relative displacement changes with an acceleration applied from outside. Accordingly, the above-mentioned capacitance difference corresponds to an acceleration occurring when movable electrode 2C moves with the acceleration.

The output terminal of detector 51 is connected to self-diagnosis part 52. Self-diagnosis part 52 applies a voltage and generates an electrostatic force between fixed electrode 3A and movable electrode 2C and also between fixed electrode 3B and movable electrode 2C. The electrostatic forces displace movable electrode 2C. Thus, self-diagnosis part 52 corresponds to control circuit 24 shown in FIGS. 1 and 7.

Figure 9:
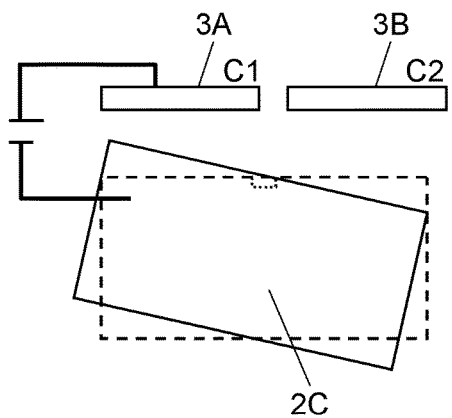
FIG. 9 is a schematic diagram showing a diagnosis performed by a self-diagnosis part in the acceleration sensor shown in FIG. 8.

FIG. 9 shows a diagnosis performed by self-diagnosis part 52 in acceleration sensor 10C. Self-diagnosis part 52 has a plurality of phases: a phase (hereinafter, Phase 1) to apply a voltage between fixed electrode 3A and movable electrode 2C, and a phase (hereinafter, Phase 2) to apply a voltage between fixed electrode 3B and movable electrode 2C.

During Phase 1 in which a voltage is applied between fixed electrode 3A and movable electrode 2C, the electrostatic force generated between electrodes 3A and 2C displaces movable electrode 2C so as to approach fixed electrode 3A and move away from fixed electrode 3B as shown in FIG. 9. As a result, the capacitance C1 between fixed electrode 3A and movable electrode 2C becomes greater than the capacitance C2 between fixed electrode 3B and movable electrode 2C.

During Phase 2 in which a voltage is applied between fixed electrode 3B and movable electrode 2C, the electrostatic force generated between electrodes 3B and 2C displaces movable electrode 2C so as to move away from fixed electrode 3A and approach fixed electrode 3B. As a result, the capacitance C1 becomes smaller than the capacitance C2.

Figure 10:
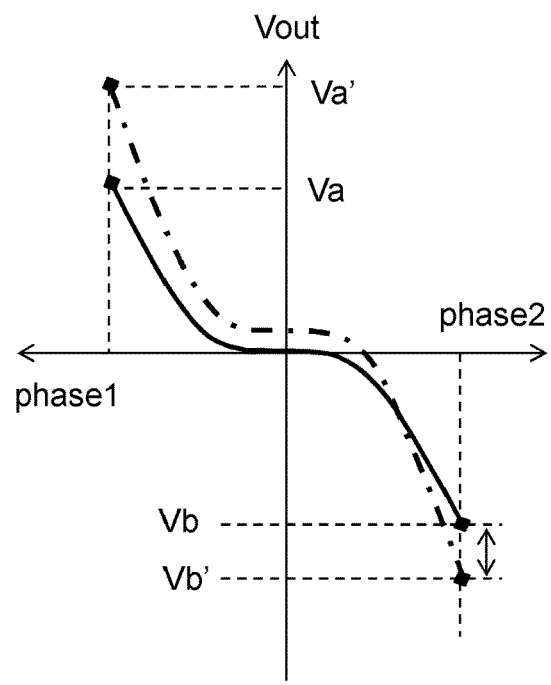
FIG. 10 shows outputs of the diagnosis performed by the self-diagnosis part in the acceleration sensor shown in FIG. 8.

FIG. 10 shows an example of outputs of the diagnosis. Voltages Va and Vb are detection voltages corresponding to the capacitance differences in Phases 1 and 2, respectively. The solid line and the broken line represent changes in the detection voltage Vout at normal temperature and at high (or low) temperature, respectively.

In this manner, the detection voltage Vout of the self-diagnosis increases or decreases with temperature. The following are some causes of the increase or decrease in the voltage with temperature. Changes in temperature change the sensitivity or offset of the sensor element or the conditions of elements of the attached IC (such as the threshold voltage and amount of current of transistors, capacitances of capacitors, and wiring resistance).

According to a conventional diagnostic method as shown in Japanese Unexamined Patent Application Publication No. H05-223844, whether the movable electrode is moving properly or not is diagnosed by comparing the outputs of the self-diagnosis (the voltages Va and Vb or voltages Va' and Vb' shown in FIG. 10) with a threshold. In this method, however, the threshold for the comparison requires a sufficient margin in order to prevent a wrong diagnosis caused by changes in the outputs with temperature (from the output Va to the output Va'). More specifically, the lower-limit threshold needs to be at least lower than the voltage Va, and the upper-limit threshold needs to be at least higher than the voltage Va'. This makes it difficult for the conventional diagnostic method to provide an accurate diagnosis.

In contrast, acceleration sensor 10C can provide a highly accurate diagnosis as follows. When a voltage is applied between fixed electrode 3A and movable electrode 2C, detector 51 outputs the first output voltage Va or Va'. On the other hand, when a voltage is applied between fixed electrode 3B and movable electrode 2C, detector 51 outputs the second output voltage Vb or Vb'. Self-diagnosis part 52 performs a diagnosis based on the difference between the absolute values of the first output voltage and the second output voltage.

Therefore, any change in the diagnostic output due to a temperature change can be cancelled by taking the difference between the absolute values of the first output voltage and the second output voltage. Using the difference for the determination achieves a highly accurate self-diagnosis regardless of the temperature change.

Figure 11:
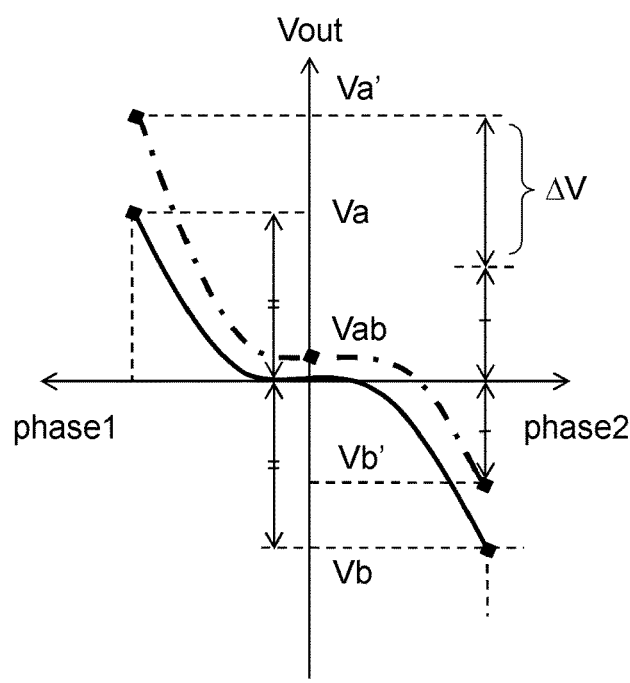
FIG. 11 shows other outputs of the diagnosis performed by the self-diagnosis part in the acceleration sensor shown in FIG. 8.

FIG. 11 shows a diagnosis of acceleration sensor 10C. The solid line and the broken line represent changes in the detection voltage Vout at normal temperature and at high (or low) temperature, respectively. The causes of the defective outputs of the self-diagnosis are considered as follows: the displacement of movable electrode 2C due to the deformation of sensor part 1 and/or the occurrence of parasitic resistance on the area where sensor part 1 is mounted or on the wires. These causes make the displacement of movable electrode 2C lose balance, thereby changing the diagnostic output.

In normal conditions, the difference between the absolute values of the first output voltage Va and the second output voltage Vb is substantially zero. In abnormal conditions, on the other hand, the difference $\Delta V$ between the absolute values of the first output voltage Va' and the second output voltage Vb' is large. Whether or not the difference $\Delta V$ is within a predetermined range can be determined to diagnose sensor part 1. The difference $\Delta V$ is the difference between the absolute values of the detection voltages in Phase 1 and 2.

In the above description, the self-diagnosis is performed based on the difference between the absolute values of the first output voltage Va' and the second output voltage Vb', but the present disclosure is not limited to this. For example, it is possible to determine whether or not a midpoint potential Vab between the first output voltage Va' and the second output voltage Vb' is within a predetermined range. This approach has similar effects to the above-described method in which the self-diagnosis is performed based on the difference between the absolute values of the first output voltage Va' and the second output voltage Vb'.

In the above description, during Phase 1, a voltage is applied between fixed electrode 3A and movable electrode 2C. To apply this voltage, the potential of either fixed electrode 3A or movable electrode 2C can be changed.

In the above description, fixed electrodes 3A and 3B are disposed on top lid 3, but this is not the only option available. For example, two fixed electrodes may be disposed on bottom lid 4, or one fixed electrode may be disposed on top lid 3 and two electrode pads may be disposed as movable electrodes. More specifically, a voltage may be applied between one fixed electrode and the first electrode pad of the movable electrode so as to obtain a first output voltage. Meanwhile, a voltage may be applied between one fixed electrode and the second electrode pad of the movable electrode so as to obtain a second output voltage. Thus, a diagnosis may be performed based on the difference between the absolute values of these output voltages. In the case of forming two electrode pads at the movable electrode, these pads can be formed into a desired shape by, for example, sputtering.

Third Exemplary Embodiment

Figure 12:
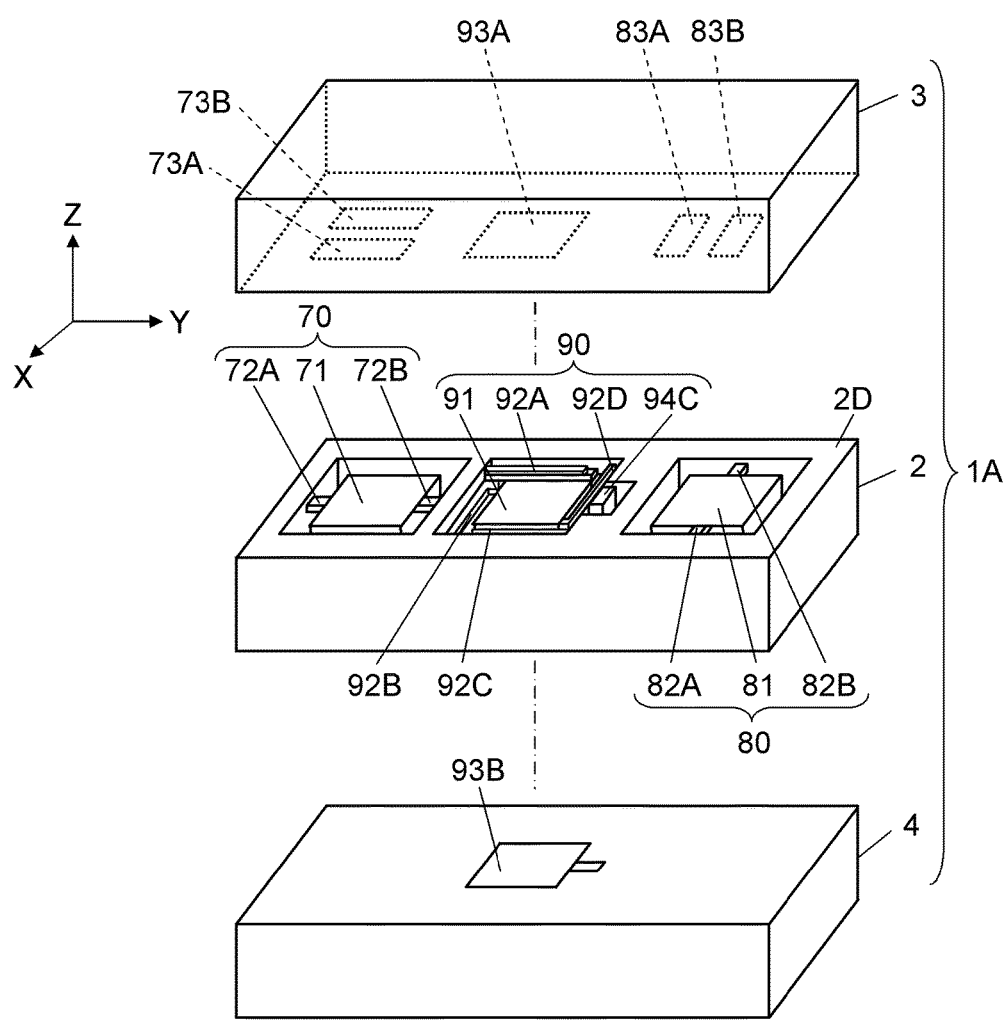
FIG. 12 is an exploded perspective view of a sensor part according to a third exemplary embodiment of the present disclosure.

FIG. 12 is an exploded perspective view of sensor part 1A according to a third exemplary embodiment of the present disclosure. Sensor part 1A includes weights (sensors) for detecting accelerations in the X-, Y-, and Z-axis directions. Accelerations in the horizontal directions (X- and Y-axis directions) can be detected by moving the respective one of the weights like a seesaw around a pair of torsion beams. An acceleration in the vertical direction (Z-axis direction) can be detected by allowing the weight held by at least one pair of beams to be vertically translated.

In the following description, in sensor part 1A, the part for detecting X-axis accelerations is referred to as X detector 70, the part for detecting Y-axis accelerations is referred to as Y detector 80, and the part for detecting Z-axis accelerations is referred to as Z detector 90. The X-axis direction is one of planar directions. The Y-axis direction is another of the planar directions and perpendicular to the X-axis direction. The Z-axis direction is a vertical direction.

X detector 70 includes a pair of beams 72A and 72B, first movable electrode 71 swingable about beams 72A, 72B, and fixed electrodes 73A and 73B. Beams 72A, 72B and first movable electrode 71 are formed in acceleration sensor element 2. Fixed electrodes 73A and 73B are disposed on the surface of top lid 3 which faces acceleration sensor element 2. When the surface of first movable electrode 71 is divided into two halves with respect to the line connecting beams 72A and 72B, one half faces fixed electrode 73A and the other half faces fixed electrode 73B.

Similar to the first exemplary embodiment, top lid 3 includes a pair of through electrodes (not shown) made, for example, of silicon, which electrically lead out fixed electrodes 73A and 73B to the upper surface of top lid 3. This configuration allows detecting the X-axis acceleration based on changes in the capacitances between first movable electrode 71 and each of fixed electrodes 73A and 73B.

Y detector 80 includes a pair of beams 82A and 82B, second movable electrode 81 swingable about beams 82A, 82B, and fixed electrodes 83A and 83B. Beams 82A, 82B and second movable electrode 81 are formed in acceleration sensor element 2. Fixed electrodes 83A and 83B are disposed on the surface of top lid 3 which faces acceleration sensor element 2. When the surface of second movable electrode 81 is divided into two halves with respect to the line connecting beams 82A and 82B, one half faces fixed electrode 83A and the other half faces fixed electrode 83B.

Top lid 3 includes another pair of through electrodes (not shown) made, for example, of silicon, which electrically lead out fixed electrodes 83A and 83B to the upper surface of top lid 3. This configuration allows detecting the Y-axis acceleration based on changes in the capacitances between second movable electrode 81 and each of fixed electrodes 83A and 83B.

Z detector 90 includes two pairs of beams 92A, 92C and 92B, 92D, third movable electrode 91 held by these beams, and fixed electrodes 93A and 93B. Beams 92A, 92B, 92C, and 92D and third movable electrode 91 are formed in acceleration sensor element 2. Fixed electrode 93A is disposed on top lid 3 at a surface which faces acceleration sensor element 2. Fixed electrode 93B is disposed on bottom lid 4 at a surface which faces acceleration sensor element 2. Third movable electrode 91 can be translated vertically thanks to beams 92A, 92B, 92C, and 92D. Fixed electrodes 93A and 93B face the front and rear surfaces, respectively, of third movable electrode 91.

Top lid 3 includes other through electrode (not shown) made, for example, of silicon, which electrically leads out fixed electrode 93A to the upper surface of top lid 3. Bottom lid 4 includes through electrode (not shown) made, for example, of silicon, which electrically leads out fixed electrode 93B to the lower surface of bottom lid 4. This configuration allows detecting the Z-axis acceleration based on changes in the capacitances between third movable electrode 91 and each of fixed electrodes 93A and 93B.

Figure 14A:
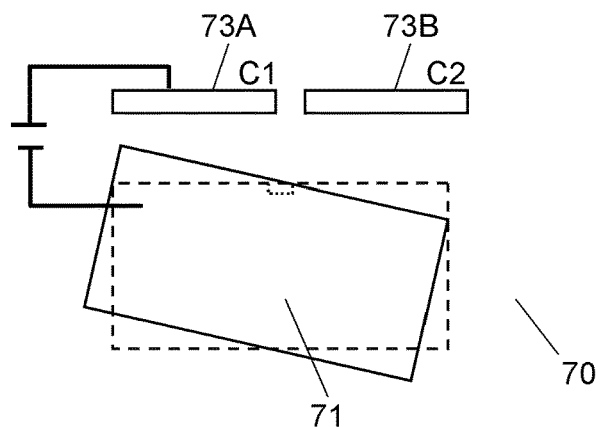
FIG. 14A shows how the self-diagnosis part of the acceleration sensor shown in FIG. 13 diagnoses an X detector.
Figure 14B:
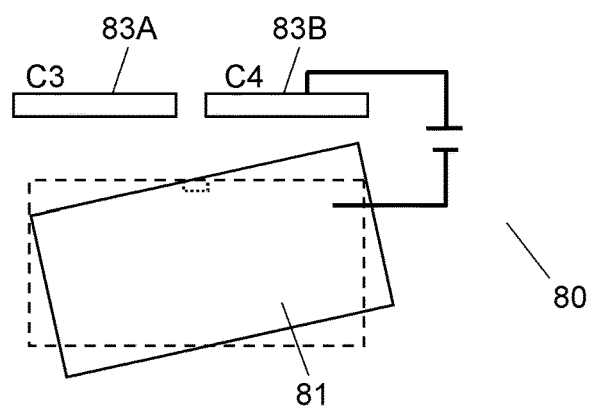
FIG. 14B shows how the self-diagnosis part of the acceleration sensor shown in FIG. 13 diagnoses a Y detector.
Figure 14C:
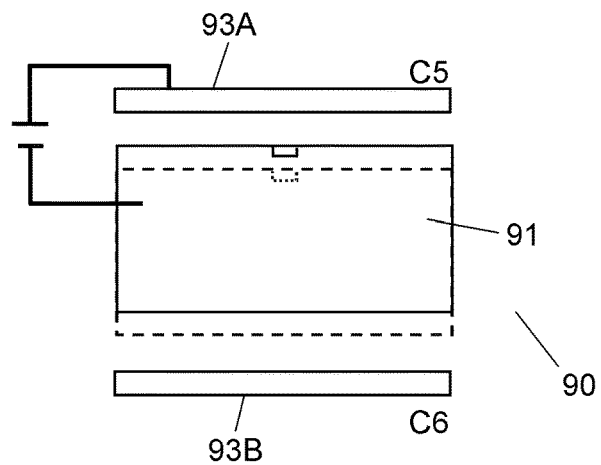
FIG. 14C shows how the self-diagnosis part of the acceleration sensor shown in FIG. 13 diagnoses a Z detector.

FIG. 13 is a block diagram of acceleration sensor 10D including sensor part 1A and signal processing circuit 50A which processes signals received from sensor part 1A. FIGS. 14A to 14C show how self-diagnosis part 52 diagnoses X detector 70, Y detector 80, and Z detector 90.

Signal processing circuit 50A includes first detector 51A, second detector 51B, third detector 51C, and self-diagnosis part 52. First detector 51A detects the relative displacement of first movable electrode 71 with respect to fixed electrodes 73A and 73B. Second detector 51B detects the relative displacement of second movable electrode 81 with respect to fixed electrodes 83A and 83B. Third detector 51C detects the relative displacement of third movable electrode 91 with respect to fixed electrodes 93A and 93B. Self-diagnosis part 52 self-diagnoses whether or not movable electrodes 71, 81, and 91 are properly displaced from the respective fixed electrodes. First, second, and third detectors 51A, 51B, and 51C are configured in the same manner as detector 51 shown in FIG. 8.

More specifically, first detector 51A first measures the capacitance C1 between fixed electrode 73A and first movable electrode 71, and the capacitance C2 between fixed electrode 73B and first movable electrode 71. First detector 51A then sends a detection voltage Vout 1 based on the difference between the capacitances C1 and C2 to an external device (not shown) through detection output terminal 65A.

The capacitances C1 and C2 change with the relative displacement (the direction and angle of twist) of first movable electrode 71 with respect to fixed electrodes 73A and 73B. Therefore, the difference between the capacitances C1 and C2 corresponds to the relative displacement of first movable electrode 71 with respect to fixed electrodes 73A and 73B. This relative displacement of first movable electrode 71 with respect to fixed electrodes 73A and 73B changes with an acceleration applied from outside. Accordingly, the above-mentioned capacitance differences correspond to the acceleration occurring when frame part 2D and first movable electrode 71 move with the acceleration.

Second detector 51B detects the relative displacement of second movable electrode 81 with respect to fixed electrodes 83A and 83B. Third detector 51C detects the relative displacement of third movable electrode 91 with respect to fixed electrodes 93A and 93B. The description of these detectors 51B and 51C is omitted because it is similar to that of first detector 51A. In short, second detector 51B sends a detection voltage Vout 2 based on the difference between capacitances C3 and C4 to an external device (not shown) through detection output terminal 65B. Third detector 51C sends a detection voltage Vout 3 based on the difference between capacitances C5 and C6 to an external device (not shown) through detection output terminal 65C.

The output terminals of first, second, and third detectors 51A, 51B, and 51C are connected to self-diagnosis part 52 so as to send detection voltages Vout 1, Vout 2, and Vout 3 to self-diagnosis part 52.

Self-diagnosis part 52 applies voltages and generates electrostatic forces between fixed electrode 73A and first movable electrode 71 and also between fixed electrode 73B and first movable electrode 71, respectively. The electrostatic forces displace first movable electrode 71.

Similarly, self-diagnosis part 52 applies voltages and generates electrostatic forces between fixed electrode 83A and second movable electrode 81 and also between fixed electrode 83B and second movable electrode 81, respectively. The electrostatic forces displace second movable electrode 81.

Similarly, self-diagnosis part 52 applies voltages and generates electrostatic forces between fixed electrode 93A and third movable electrode 91 and also between fixed electrode 93B and third movable electrode 91, respectively. The electrostatic forces displace third movable electrode 91.

FIGS. 14A, 14B, and 14C show how self-diagnosis part 52 diagnoses acceleration sensor 10D. FIG. 14A shows a diagnosis of X detector 70. FIG. 14B shows a diagnosis of Y detector 80. FIG. 14C shows a diagnosis of Z detector 90.

As shown in FIG. 14A, self-diagnosis part 52 has a plurality of phases: a phase (hereinafter, Phase 1) to apply a voltage between fixed electrode 73A and first movable electrode 71, and a phase (hereinafter, Phase 2) to apply a voltage between fixed electrode 73B and first movable electrode 71.

During Phase 1 in which a voltage is applied between fixed electrode 73A and first movable electrode 71, the electrostatic force generated between electrodes 73A and 71 displaces first movable electrode 71 to approach fixed electrode 73A and to move away from fixed electrode 73B. As a result, the capacitance C1 between fixed electrode 73A and first movable electrode 71 becomes greater than the capacitance C2 between fixed electrode 73B and first movable electrode 71.

During Phase 2 in which a voltage is applied between fixed electrode 73B and first movable electrode 71, the electrostatic force generated between electrodes 73B and 71 displaces first movable electrode 71 to move away from fixed electrode 73A and to approach fixed electrode 73B. As a result, the capacitance C1 between fixed electrode 73A and first movable electrode 71 becomes smaller than the capacitance C2 between fixed electrode 73B and first movable electrode 71.

As shown in FIG. 14B, self-diagnosis part 52 has a plurality of phases: a phase (hereinafter, Phase 3) to apply a voltage between fixed electrode 83A and second movable electrode 81, and a phase (hereinafter, Phase 4) to apply a voltage between fixed electrode 83B and second movable electrode 81.

During Phase 3 in which a voltage is applied between fixed electrode 83A and second movable electrode 81, the electrostatic force generated between electrodes 83A and 81 displaces second movable electrode 81 to approach fixed electrode 83A and to move away from fixed electrode 83B. As a result, the capacitance C3 between fixed electrode 83A and second movable electrode 81 becomes greater than the capacitance C4 between fixed electrode 83B and second movable electrode 81.

During Phase 4 in which a voltage is applied between fixed electrode 83B and second movable electrode 81, the electrostatic force generated between electrodes 83B and 81 displaces second movable electrode 81 to move away from fixed electrode 83A and to approach fixed electrode 83B. As a result, the capacitance C3 between fixed electrode 83A and second movable electrode 81 becomes smaller than the capacitance C4 between fixed electrode 83B and second movable electrode 81.

As shown in FIG. 14C, self-diagnosis part 52 has a plurality of phases: a phase (hereinafter, Phase 5) to apply a voltage between fixed electrode 93A and third movable electrode 91, and a phase (hereinafter, Phase 6) to apply a voltage between fixed electrode 93B and third movable electrode 91.

During Phase 5 in which a voltage is applied between fixed electrode 93A and third movable electrode 91, the electrostatic force generated between electrodes 93A and 91 displaces third movable electrode 91 to approach fixed electrode 93A and to move away from fixed electrode 93B. As a result, the capacitance C5 between fixed electrode 93A and third movable electrode 91 becomes greater than the capacitance C6 between fixed electrode 93B and third movable electrode 91.

During Phase 6 in which a voltage is applied between fixed electrode 93B and third movable electrode 91, the electrostatic force generated between electrodes 93B and 91 displaces third movable electrode 91 to move away from fixed electrode 93A and to approach fixed electrode 93B. As a result, the capacitance C5 between fixed electrode 93A and third movable electrode 91 becomes smaller than the capacitance C6 between fixed electrode 93B and third movable electrode 91.

Figure 15A:
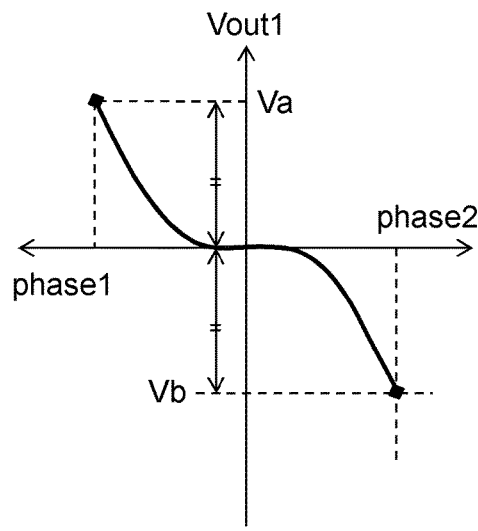
FIG. 15A shows outputs of the diagnosis of the X detector performed by the self-diagnosis part of the acceleration sensor shown in FIG. 13.
Figure 15B:
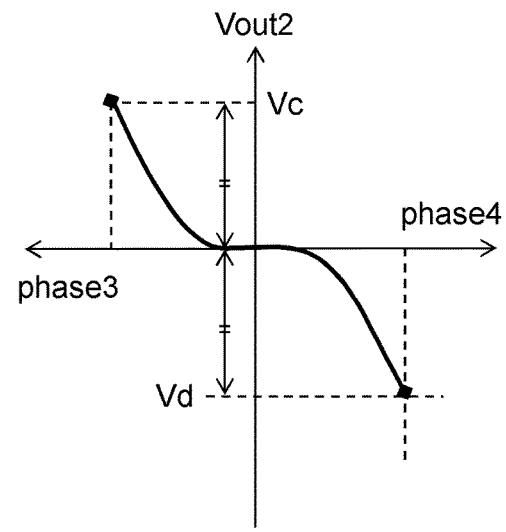
FIG. 15B shows outputs of the diagnosis of the Y detector performed by the self-diagnosis part of the acceleration sensor shown in FIG. 13.
Figure 15C:
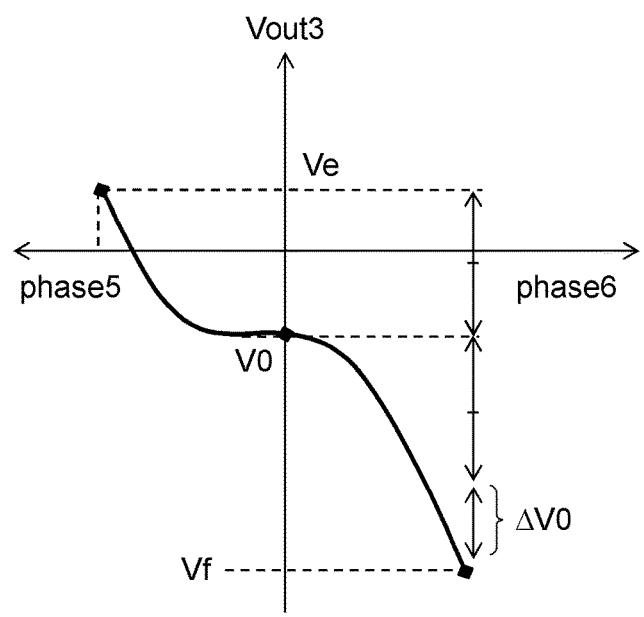
FIG. 15C shows outputs of the diagnosis of the Z detector performed by the self-diagnosis part of the acceleration sensor shown in FIG. 13.

FIGS. 15A to 15C show examples of outputs of the diagnosis. FIG. 15A shows outputs of the diagnosis by X detector 70. FIG. 15B shows outputs of the diagnosis by Y detector 80. FIG. 15C shows outputs of the diagnosis by Z detector 90. These outputs are on the assumption that sensor part 1A is placed horizontally, and that Z detector 90 is given 1 G, which is equal to the gravitational acceleration.

In FIG. 15A, the voltages Va and Vb are detection voltages corresponding to the capacitance differences in Phases 1 and 2, respectively. In FIG. 15B, voltages Vc and Vd are detection voltages corresponding to the capacitance differences in Phases 3 and 4, respectively. In FIG. 15C, voltages Ve and Vf are detection voltages corresponding to the capacitance differences in Phases 5 and 6, respectively.

Self-diagnosis part 52 receives diagnostic outputs from X detector 70, Y detector 80, and Z detector 90 and diagnoses the presence or absence of a fault in each of detectors 70, 80, and 90.

The diagnosis of each of X detector 70 and Y detector 80 is omitted because it is similar to that described in the second exemplary embodiment, and the following description will be focused on the diagnosis of Z detector 90.

As shown in FIG. 15C, in Z detector 90, when a voltage is applied between fixed electrode 93A and third movable electrode 91, third detector 51C outputs a first output voltage Ve. When, on the other hand, a voltage is applied between fixed electrode 93B and third movable electrode 91, third detector 51C outputs a second output voltage Vf. In Z detector 90, third movable electrode 91 is given the gravitational acceleration (−1 G) when a diagnosis is started. Therefore, the zero point of the diagnostic output (voltage V0 in FIG. 15C: a negative value) is offset by 1 G. More specifically, self-diagnosis part 52 performs a diagnosis based on the difference between the absolute value of the absolute value of the first output voltage Ve plus V0 and the absolute value of the absolute value of the second output voltage Vf minus V0.

When the diagnosis is started, third movable electrode 91 is lowered by the gravitational acceleration. This increases the electrostatic force for the self-diagnosis between third movable electrode 91 and fixed electrode 93B. As a result, the capacitance C6 between third movable electrode 91 and fixed electrode 93B further increases during the diagnosis. Hence, as shown in FIG. 15C, the difference ΔV0 does not become zero.

Thus, in the case that the diagnostic output is other than zero when the diagnosis is started, it may cause erroneous determination if a comparison is made between the threshold and the difference ΔV0 between the absolute values of the offset values of the first output voltage Ve and the second output voltage Vf. To avoid this, it is preferable to store the difference ΔV0 in, for example, memory (not shown) and to perform a threshold comparison to determine whether or not the difference between the voltages Ve and Vf is within a predetermined range with reference to the voltage V0. This achieves a highly accurate diagnosis even if the movable electrode is displaced by the gravitational acceleration when the diagnosis is started.

Alternatively, sensor part 1A may be determined to be at fault when one of the following differences exceeds the corresponding predetermined range: the difference between the absolute values of the voltages Va and Vb; the difference between the absolute values of the voltages Vc and Vd; and the difference between the absolute values of the offset values of the voltages Ve and Vf.

In the above description, sensor part 1A includes X detector 70, Y detector 80, and Z detector 90. Alternatively, however, sensor part 1A may have two of detectors 70, 80, and 90 whereas signal processing circuit 50A may have two of first to third detectors 51A to 51C corresponding to the two of detectors 70, 80, and 90. Detectors 70, 80, and 90 detect accelerations in the X-, Y-, and Z-axis directions perpendicular to each other, but these axial directions do not always have to be perpendicular to each other. In other words, sensor part 1A is only necessary to detect accelerations in first, second, and third directions.

In the second and third exemplary embodiments, self-diagnosis part 52 may be configured to output a fault detection signal when sensor parts 1 and 1A are determined to be at fault.

The first exemplary embodiment may have sensor part 1A used according to the third exemplary embodiment instead of sensor part 1 and have additional detection circuits for detecting accelerations in the Y- and Z-axis directions.

The acceleration sensor of the present disclosure is useful as an acceleration sensor for vehicle control, for example.

What is claimed is:

1. An acceleration sensor comprising:
   a movable electrode to be displaced with a change in applied acceleration;
   a fixed electrode disposed to face the movable electrode;
   a CV conversion circuit for outputting a voltage corresponding to capacitance changes between the movable electrode and the fixed electrode;
   an AD conversion circuit connected to the CV conversion circuit and having a first detection range and a second detection range different from the first detection range;
   a first register connected to the AD conversion circuit and holding a first value containing information about an acceleration in the first detection range; and
   a second register connected to the AD conversion circuit and holding a second value containing information about an acceleration in the second detection range,
   wherein the first value and the second value indicate accelerations in an equal direction,
   the first value is obtained by digitizing the applied acceleration at a higher resolution than the second value, and
   the first detection range corresponds to lower acceleration rates than the second detection range.

2. The acceleration sensor according to claim 1, further comprising a control circuit for self-diagnosing the acceleration sensor by comparing the first value and the second value.

3. The acceleration sensor according to claim 2, wherein the control circuit determines that the acceleration sensor malfunctioned when a difference between the second value and a product of the first value and a predetermined coefficient is not less than a threshold.

4. The acceleration sensor according to claim 3, wherein the fault exists in the AD conversion circuit.

5. The acceleration sensor according to claim 4, wherein the AD conversion circuit includes a first AD converter connected to the first register and a second AD converter connected to the second register.

6. The acceleration sensor according to claim 5, wherein the fault exists in one of the first AD converter and the second AD converter.

7. The acceleration sensor according to claim 5, wherein the first AD converter has higher resolution than the second AD converter.

8. The acceleration sensor according to claim 1, further comprising a signal conditioning circuit disposed between the CV conversion circuit and the AD conversion circuit and connected in series with the CV conversion circuit and the AD conversion circuit.

* * * * *